No. 830,812. PATENTED SEPT. 11, 1906.
H. H. WAIT.
PROTECTIVE APPARATUS FOR COMPENSATOR DYNAMOS.
APPLICATION FILED JAN. 18, 1904.
4 SHEETS—SHEET 2.
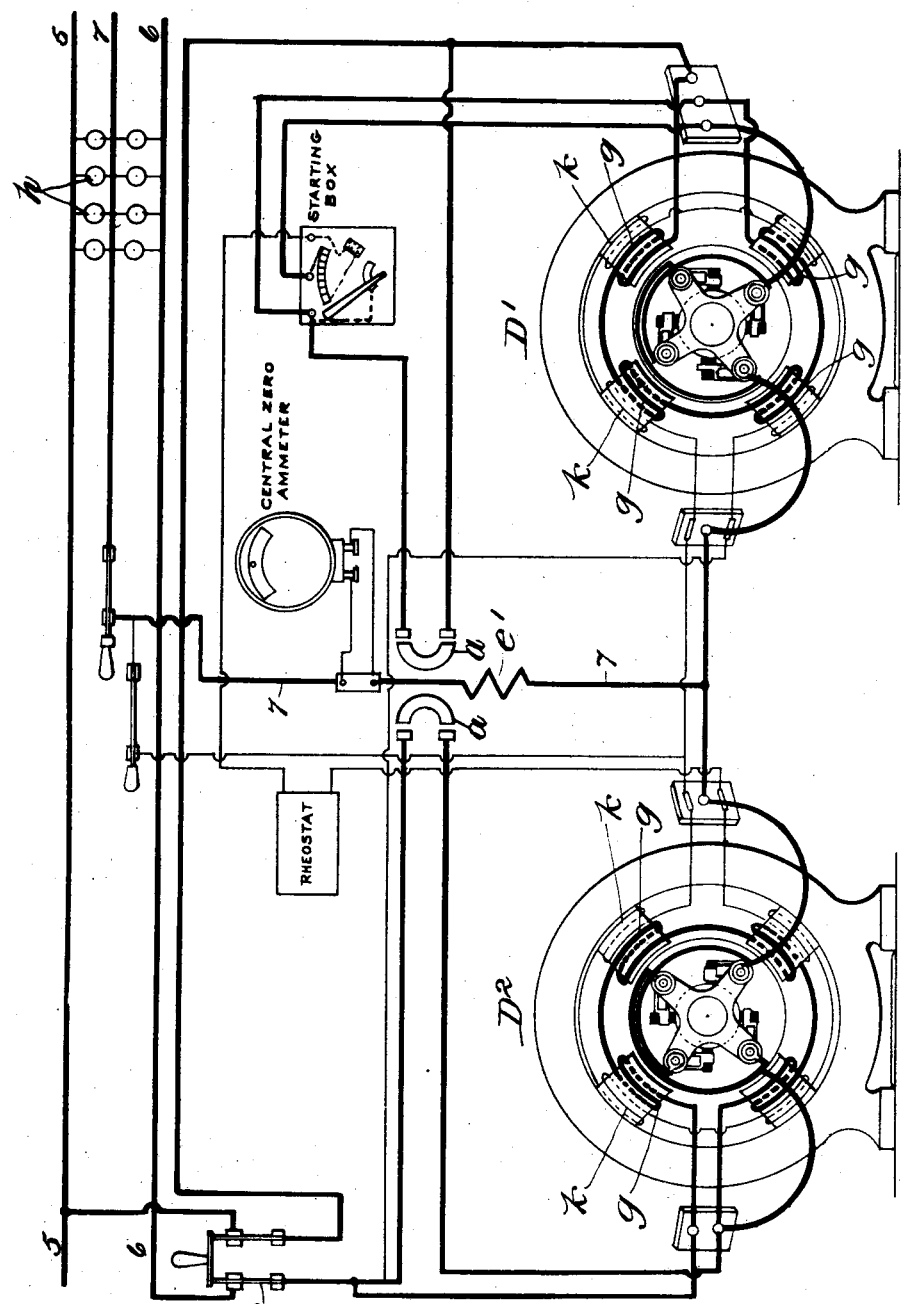

No. 830,812. PATENTED SEPT. 11, 1906.
H. H. WAIT.
PROTECTIVE APPARATUS FOR COMPENSATOR DYNAMOS.
APPLICATION FILED JAN. 18, 1904.
4 SHEETS—SHEET 3.
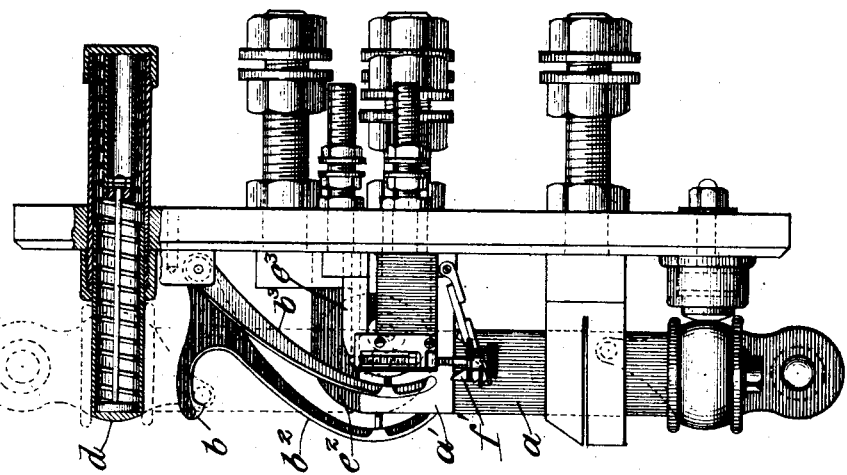
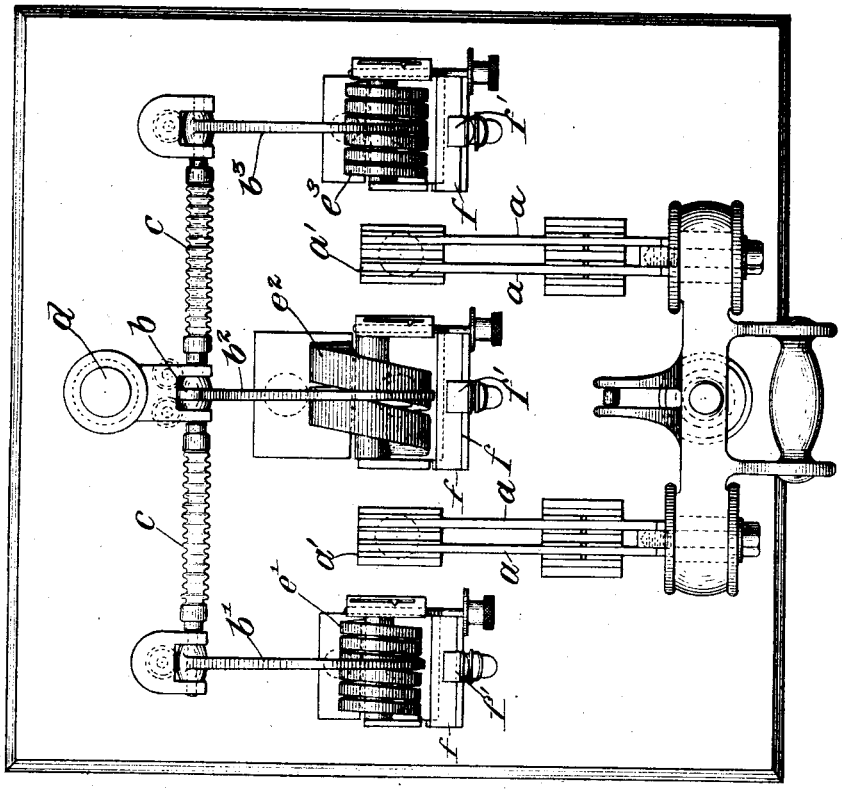
Witnesses:
Inventor:
Henry H. Wait.

No. 830,812. PATENTED SEPT. 11, 1906.
H. H. WAIT.
PROTECTIVE APPARATUS FOR COMPENSATOR DYNAMOS.
APPLICATION FILED JAN. 18, 1904.

4 SHEETS—SHEET 4.

Witnesses:
Edw. Barrett
Alfred H. Moore

Inventor
Henry H. Wait
By Barton & Tanner,
Attys

UNITED STATES PATENT OFFICE.

HENRY H. WAIT, OF CHICAGO, ILLINOIS, ASSIGNOR TO WESTERN ELECTRIC COMPANY, OF CHICAGO, ILLINOIS, A CORPORATION OF ILLINOIS.

PROTECTIVE APPARATUS FOR COMPENSATOR-DYNAMOS.

No. 830,812.   Specification of Letters Patent.   Patented Sept. 11, 1906.

Application filed January 18, 1904. Serial No. 189,411.

*To all whom it may concern:*

Be it known that I, HENRY H. WAIT, a citizen of the United States, residing at Chicago, in the county of Cook and State of Illinois, have invented a certain new and useful Improvement in Protective Apparatus for Compensator-Dynamos, of which the following is a full, clear, concise, and exact description.

My invention relates to a compensating system of electrical distribution, such as the so-called "three-wire" system, and more particularly to a system in which compound-wound compensator-dynamos are employed. The series field-windings of such compensators are so connected as to partially neutralize the field created by the shunt-winding of the machine which at the time is running as a motor, this arrangement resulting in a closer compensation than would be possible with a simple shunt-wound compensator; but while the compound-wound machine is better than the shunt-wound with respect to closeness of regulation it has the disadvantage that if an abnormally heavy overload is thrown on one side of the system the current flowing through the series winding of the machine whose armature is connected across the other side of the system may increase to a point where it nearly or quite neutralizes the field produced by the shunt-winding. As the machine is at this time running as a motor, the result of the weakening of its field is to cause a tendency for the machine to race, thereby driving the generator on the other side of the system at an abnormally high speed, and so tending to increase the load on the generator, which still further augments the overload on the compensating machine and weakens the series field.

In accordance with my invention I provide an automatic circuit-closing switch actuated when the current in the circuit increases beyond a certain predetermined amount to short-circuit the series field-windings and allow the compensators to run as simple shunt-wound machines.

I will describe my invention more particularly by reference to the accompanying drawings, in which—

Figure 1:
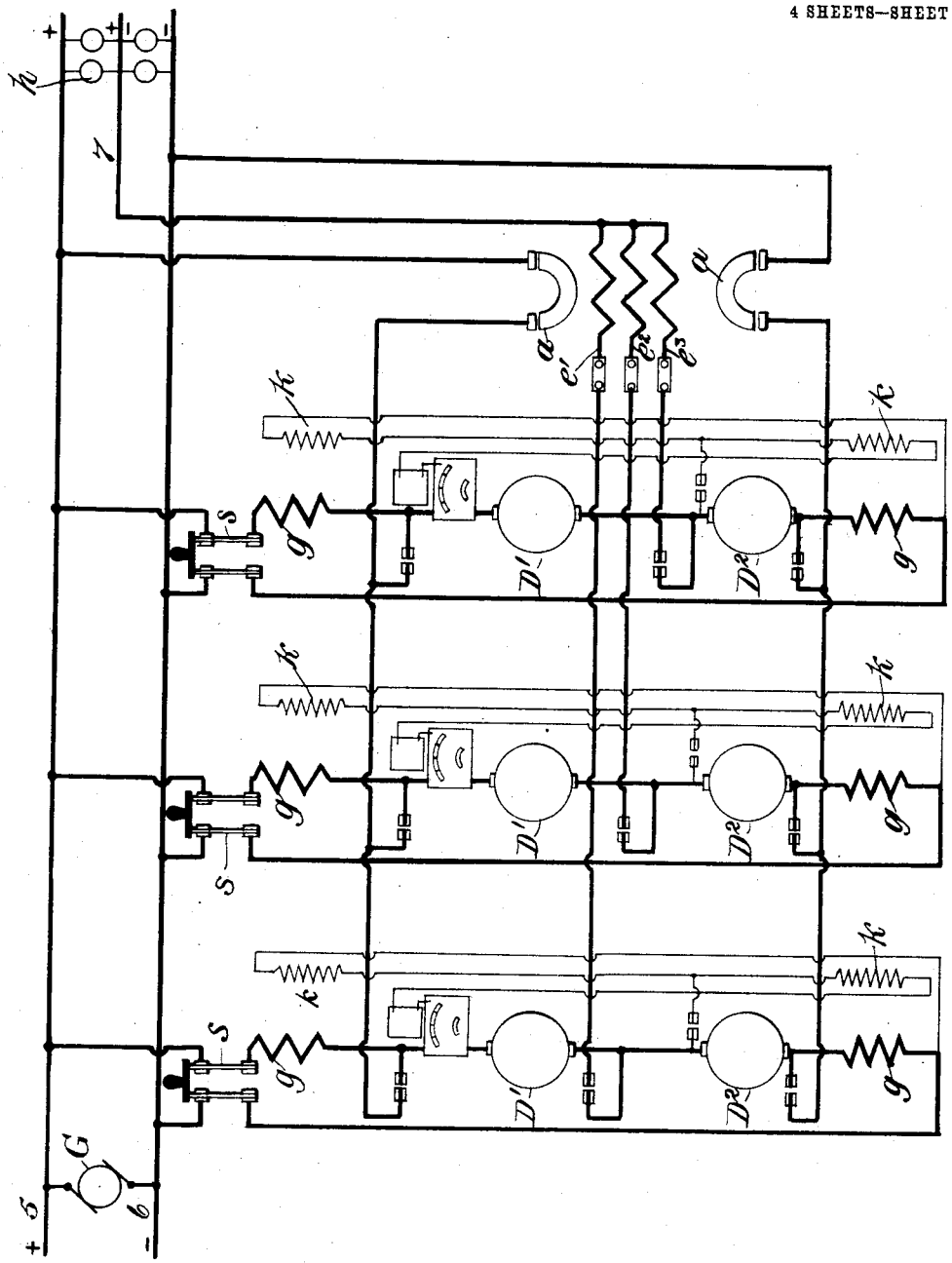
Figure 6:
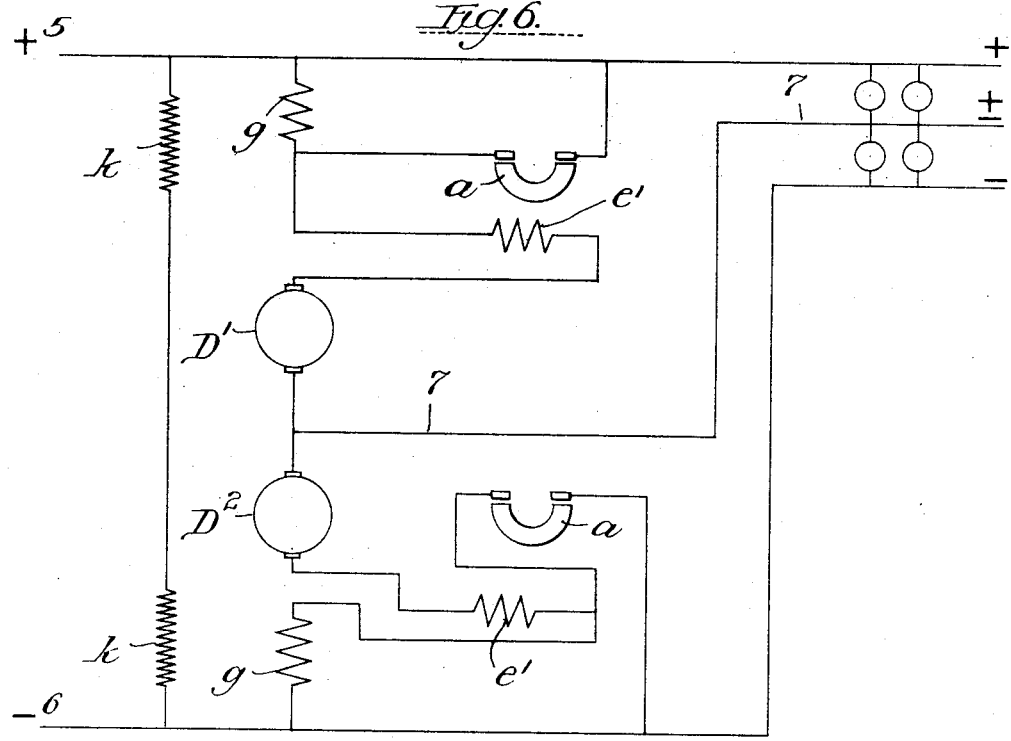
Figure 5:
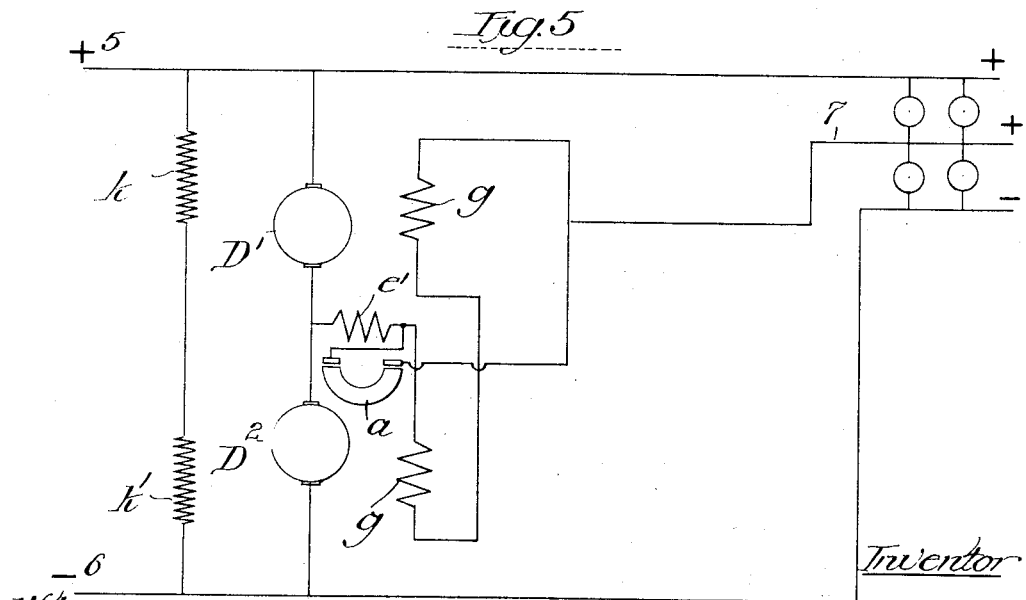

Figure 1 is a diagram showing a system in which three sets of compound-wound compensating machines are connected in multiple with an automatic circuit-closing switch for short-circuiting the series field-windings, said switch having three magnets, the switch being actuated when the current in either magnet rises above the predetermined value. Fig. 2 shows the application of the invention to a single set of compensating machines. Fig. 3 is a front elevation of the automatic switch used with the system shown in Fig. 2. Fig. 4 is a side elevation of said switch, and Figs. 5 and 6 are diagrams illustrating my invention embodied in compensator systems of slightly-modified form.

The same characters of reference are used to designate the same parts wherever they are shown.

Referring first to Figs. 3 and 4, a double-pole knife-switch having its blades $a\ a$ pivoted at $a'\ a'$ is normally held in an open position, as shown in dotted lines in Fig. 4, by a detent $b$, carried upon a horizontal rocking shaft $c$. A spring-impelled plunger $d$ is adapted when the switch is released by the detent to give it an outward push, such that it will swing down into the closed position, as shown in full lines. Three trip arms or triggers $b'\ b^2\ b^3$ are rigidly carried by the rocking shaft $c$, whereby said shaft may be rocked to raise the detent and release the switch by actuating any one of said triggers. Said triggers are arranged to be independently actuated by electromagnets $e'\ e^2\ e^3$, respectively. Each of said magnets consists of a heavy-coiled copper conductor encircling an iron core, and a pivoted iron armature-lever $f$, mounted in position to be attracted by said core. The armature-lever $f$ of each magnet carries a trip $f'$, the beveled face whereof is adapted to engage and move the projecting end of the corresponding trigger when the armature-lever is drawn up. Whenever the current in either of the coils $e'\ e^2\ e^3$ rises above the predetermined value, the corresponding trigger will be actuated to rock the shaft $c$ and raise the detent $b$, whereby the switch $a$ will be released automatically and close itself.

Referring now to Fig. 1, the three-wire system shown is organized and equipped in a well-known manner, except that an automatic switch $a$, such as shown in Figs. 3 and 4, is provided for short-circuiting the series field-windings $g\ g$ of the several multiple compensators. Current is derived from the mains 5 6 to supply the lamps or translating devices $h$ $h$, which are connected between said mains, respectively, and a compensating conductor 11. Three sets of compound-wound compensators are shown, each set comprising two dynamo-machines $D'$ $D^2$, the armatures whereof are connected in series across the mains 5 6. The armatures of machines $D'$ and $D^2$ are mechanically connected to rotate together, and in practice they are usually mounted on the same shaft. It is understood, of course, that in a compensating system the current is supplied to the mains 5 6 by a central generator G and that the compensator-dynamos $D'$ $D^2$ are mechanically coupled and electrically connected between the main conductors, respectively, and the compensating conductor. When one side of such a system is loaded more than the other, one of the compensator-dynamos will be driven by the other, which is run as a motor, to supply additional current to the overloaded side of the system. The compensating conductor 7 is connected through the magnet-coils $e'$ $e^2$ $e^3$, respectively, of the automatic switch in multiple to the middle points between each pair of armatures of the three compensator sets. Each compensator is provided with shunt field-windings $k$ $k$ and series field-windings $g$ $g$; but the switch $a$ is adapted when closed to short-circuit all the series fields and connect the armatures direct to the mains 5 6. The usual switches $s$ $s$ are indicated for controlling the circuits of the several machines.

Fig. 2 shows the same circuit arrangements as Fig. 1, but for a single pair of compensators, and the same reference characters are applied to corresponding parts.

In the operation of the system the switch $a$ is normally open, leaving the series field-windings of the compensators in circuit; but if one side or the other of the system should be abnormally overloaded one or more of the magnets $e'$ $e^2$ $e^3$, according to circumstances, will receive sufficient current to raise the corresponding armature until the trip carried thereby engages the trigger, and so .ocks the shaft $c$ to release the switch $a$, which automatically closes and short-circuits the series fields, so preventing the racing of the machines and other troubles which would otherwise result. Of course the operation of the automatic switch should serve as a warning, and steps should be taken at once to equalize the load on the system.

In Fig. 5 I have shown the magnet-coil $e'$ for operating the switch $a$ included directly in the circuit of the series coils of two dynamos, while in Fig. 6 I have illustrated two dynamos each provided with a magnet-coil $e'$ included in series with the armature and series field thereof. With either of these arrangements the magnet-coil $e$ will operate to close the automatic switch controlled thereby whenever the current in the series field becomes increased beyond a predetermined point, no matter what the cause of such increase of current may be, whether due to short-circuits in the armature or to abnormal conditions which may arise in the external circuit of the system.

Having thus described my invention, I claim—

1. In a compensating system of electrical distribution, the combination with the main generator and compensator-dynamos provided with compound windings, of an electromagnetic switch responsive to excessive current through one side of the system, adapted in its response to render inoperative the series field-windings of said compensator-dynamos.

2. In a compensating system of electrical distribution, the combination with a main generator, of sets of compound-wound compensator-dynamos connected in multiple between the distributing-mains and the compensating conductor of the system, a self-closing switch adapted to short-circuit the series field-windings of all of said compensator-dynamos, magnet-windings in circuit between said compensating conductor and each of said dynamos, and means responsive to an excessive current in either of said magnet-windings for causing the closure of said switch.

3. The combination with a number of pairs of compensator-dynamos in a compensating system of electrical distribution, of a short-circuiting switch controlling the field-windings of said dynamos, said switch comprising pivoted switch-blades and contacts therefor, a detent normally holding the switch open, a spring for closing the switch when released, electromagnets connected to respond to excessive current in one side of the system, and armatures for said electromagnets, arranged to disengage said detent and release the switch, substantially as and for the purpose set forth.

4. In a compensating system of electrical distribution, the combination with a main generator, main distributing conductors connected with the terminals of said generator, a neutral or compensating conductor and translating devices connected between said compensating conductor and said main conductors respectively, of compensator-dynamos mechanically coupled and electrically connected between said main conductors respectively and said compensating conductor, said compensator-dynamos being provided with compound windings, a switch adapted to short-circuit the series field-windings of said dynamos, and means controlled by the passage of excessive current in the circuit through one of said dynamos to the compensating conductor, for actuating said switch.

5. The combination with a compensating system of electrical distribution, comprising main conductors 5, 6, and a compensating conductor 7, of compensator-dynamos mechanically coupled and electrically connected between said main conductors respectively and said compensating conductor, said dynamos having compound field-windings, and means responsive to an excessive current in the series field-windings of said compensator-dynamos for short-circuiting said windings, substantially as set forth.

6. The combination with a compensating system of electrical distribution comprising a main generator, main distributing-conductors connected with the terminals of said generator, a compensating conductor, translating devices connected between said compensating conductor and each of said main conductors, a number of compensator-dynamo sets, each set comprising two dynamos mechanically coupled and electrically connected between the main conductors respectively and the compensating conductor, said compensator-dynamos having compound field-windings, an electromagnetic switch controlling short-circuits of the series field-windings of all of said compensator-dynamos, a number of magnets responsive to excessive current between said compensating conductor and either of the main conductors through any of said compensator-dynamos, and means controlled by the response of any of said magnets for closing said switch, whereby all of the series field-windings of the compensator-dynamos are short-circuited when excessive overload comes on either side of the system.

In witness whereof I hereunto subscribe my name this 16th day of January, A. D. 1904.

HENRY H. WAIT.

Witnesses:
EDWIN H. SMYTHE,
IRVING MACDONALD.